Figure 1:
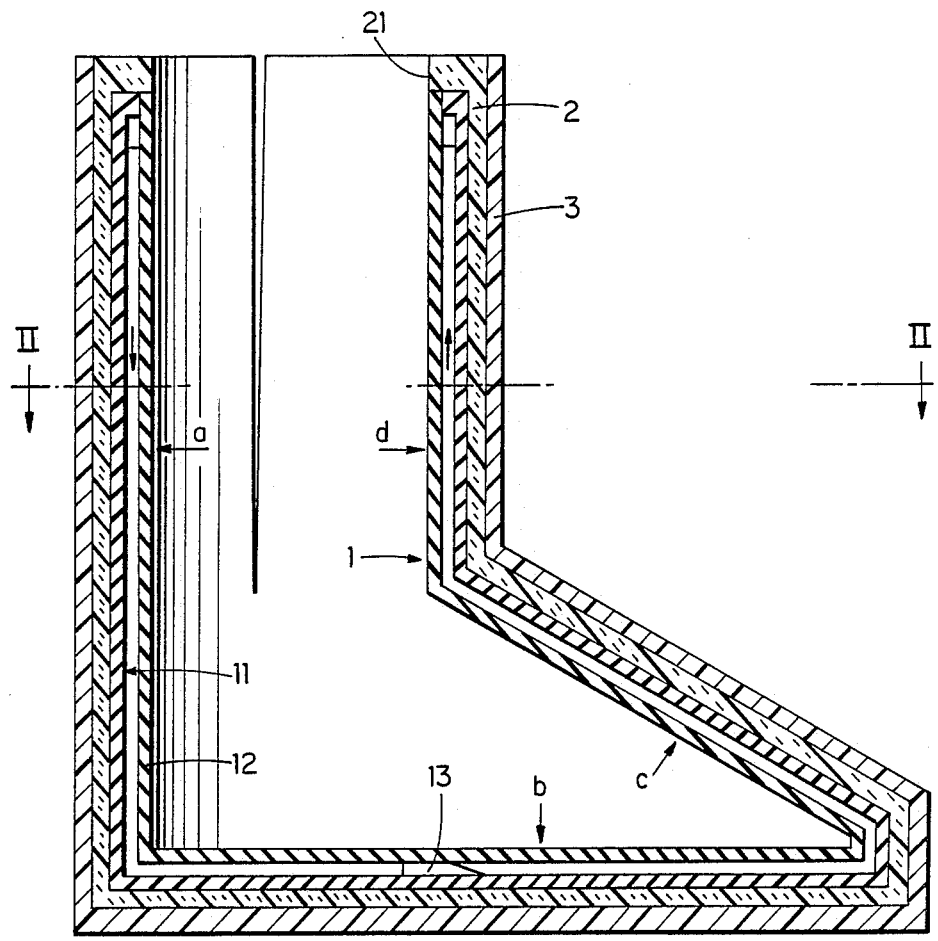

United States Patent [19]

Kaiser

[11] Patent Number: 4,953,309

[45] Date of Patent: Sep. 4, 1990

[54] WARMING FOOTWEAR

[75] Inventor: Stanislav Kaiser, Titovo Velenje, Yugoslavia

[73] Assignee: Alpina Tovarna Obutve N.Sol.O., Ziri, Yugoslavia

[21] Appl. No.: 226,734

[22] Filed: Aug. 1, 1988

[30] Foreign Application Priority Data

Sep. 4, 1987 [YU] Yugoslavia ............................ 1644/87
Sep. 4, 1987 [YU] Yugoslavia ............................ 1645/87

[51] Int. Cl.$^5$ .............................................. A43B 7/02
[52] U.S. Cl. ...................................................... 36/2.6
[58] Field of Search ................ 128/382, 402, 302, 383, 128/403; 36/2.6, 3 R, 3 A; 126/204; 165/46

[56] References Cited

U.S. PATENT DOCUMENTS

| | | | |
|---|---|---|---|
| 518,579 | 4/1894 | Annenberg et al. | 36/2.6 |
| 885,112 | 4/1908 | Waller | 36/2.6 |
| 1,199,914 | 10/1916 | Mossor | 36/2.6 |
| 1,213,941 | 1/1917 | Patrick | 36/3 A |
| 1,335,273 | 3/1920 | Bruce | 36/3 R |
| 2,703,937 | 3/1955 | McGinn | 36/3 R |
| 4,267,651 | 5/1981 | Albano | 36/3 R |
| 4,480,635 | 11/1984 | Ostrovsky | 165/46 X |
| 4,507,877 | 4/1985 | Vaccari et al. | 36/2.6 |
| 4,697,360 | 10/1987 | Sartor | 36/2.6 |
| 4,736,530 | 4/1988 | Lakic et al. | 36/2.6 |
| 4,799,319 | 1/1989 | Zellweger | 36/2.6 |
| 4,800,867 | 1/1989 | Owens | 36/2.6 X |

FOREIGN PATENT DOCUMENTS

| | | |
|---|---|---|
| 0163045 | 3/1985 | European Pat. Off. . |
| 0163133 | 4/1985 | European Pat. Off. . |
| 2587884 | 4/1987 | France ............................ 36/117 |

*Primary Examiner*—Paul T. Sewell
*Assistant Examiner*—Andrew D. Meyers
*Attorney, Agent, or Firm*—Fleit, Jacobson, Cohn, Price, Holman & Stern

[57] ABSTRACT

Warming footwear, which has a heat exchanging system 1 built in an inshoe 2 from a shin portion d over an instep portion c and a toe portion b to a calf portion a. The system 1 is composed of a ribbed plate 11, of an elastic foil 12 and of two nonreturn valves 13, 14, which valves are inserted in two conduits, which are limited by the plate 11, by its ribs and by the foil 12, which is fastened to said ribs and functions as bellows when the foot moves and across which a liquid in the conduits receives and renders heat. Alternatively, in the instep portion c a sunlight collector 4 is performed.

4 Claims, 3 Drawing Sheets

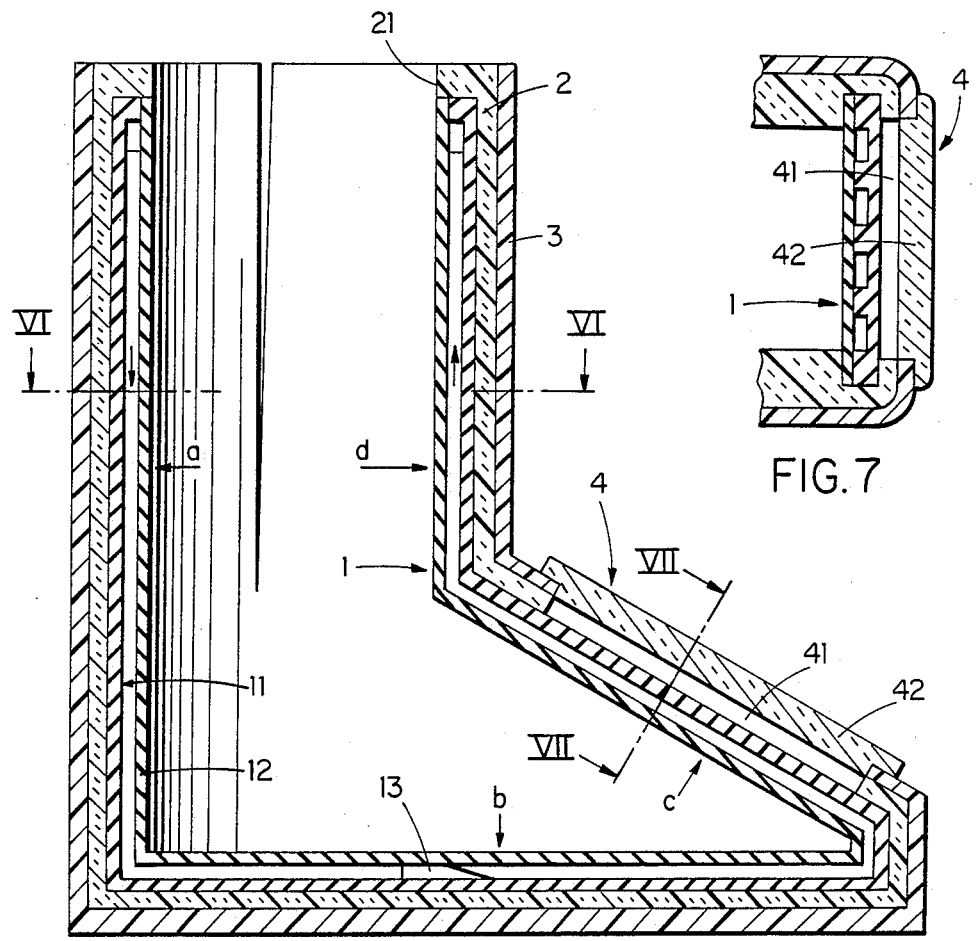
FIG. 5
FIG. 7
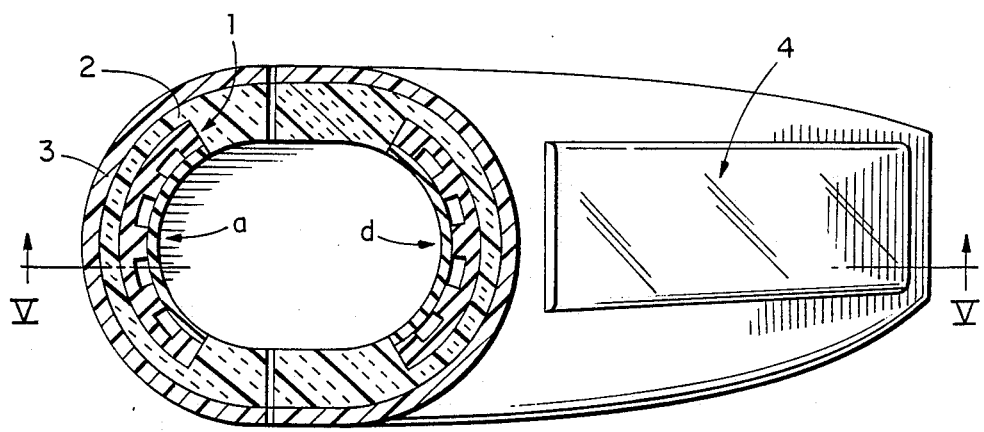
FIG. 6

WARMING FOOTWEAR

The present invention relates to footwear with a heat exchanging system incorporated therein.

In the published European patent application Nos. A3-163 045 and A3-163 133 an insole is described, in which a flexible metal layer is comprised, conducting heat from the warmer portions of the foot sole to the colder ones. The heat flow thus transferred is often not sufficient since the whole foot is poorly supplied with blood.

The problem solved by the present invention lies in providing footwear, in which the warming of cold foot portions should be performed by heat supply from warmer leg portions by means of a heat transferring liquid and, alternatively, this liquid being additionally warmed up by sunlight; the energy for the liquid circulation, however, should be completely supplied by moving the feet, e.g. when walking, skiing.

The object of the invention is warming footwear, in which a heat exchanging system is incorporated in an inshoe from a calf portion over a sole portion to a shin portion. The heat exchanging system is performed on a ribbed plate, which on its one side is surrounded by a border rib and on the same side is provided with a partition rib, by which the plate side is divided into two portions and by which the border rib is not touched anywhere. On the border rib and on the partition rib an elastic foil is fastened, entirely covering said plate side. In either of two mutually interconnected conduits, which are limited by the plate, by the elastic foil and by said ribs and which are filled up with a heat transferring liquid, there is inserted a nonreturn valve, both valves being oriented in the same sense of the conduit loop. The elastic foil represents a part of the inner surface of the inshoe.

According to another embodiment of the invention, a transparent windowpane is fastened along its edge to the border of an opening performed in the footwear within the instep portion.

An advantage of the warming footwear according to the invention exists above all in that the heat from warm leg portions, i.e. from the calf and shin portion, is transferred to foot portions like footsole, which are poorly supplied with blood, whereat there is needed no unit to circulate and to warm up the heat transferring liquid.

A further advantage exists in that the heat transferring liquid is additionally warmed up by sunlight.

Figure 2:
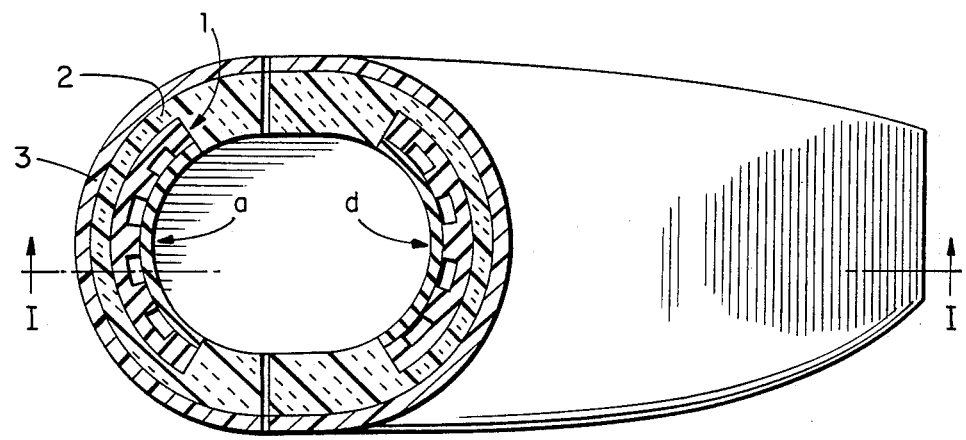
Figures 3, 4:
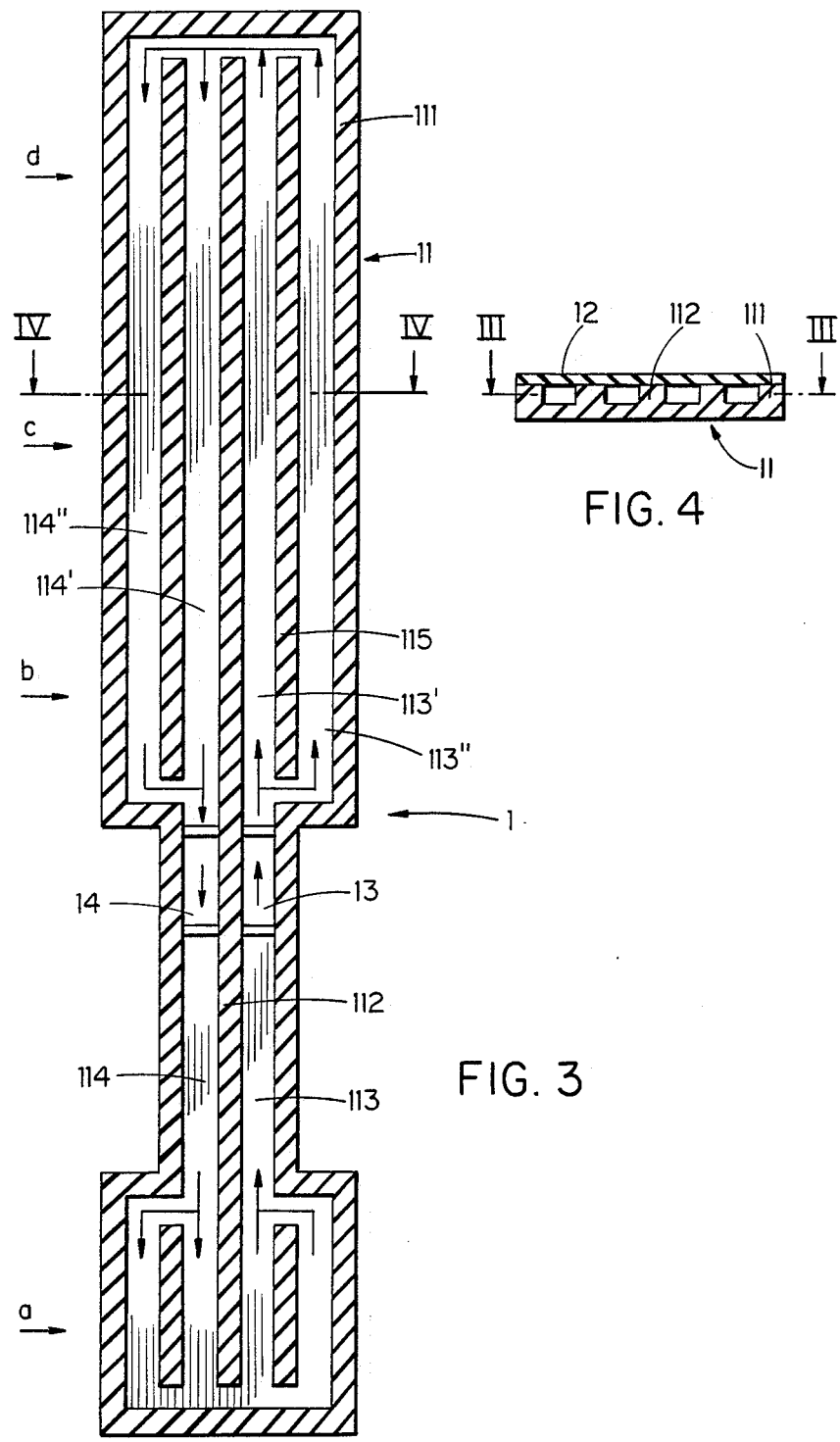

Specific embodiments of the invention will be presented in the following detailed description in connection with the accompanying drawings, in which FIG. 1 is a vertical periaxial cut of the warming footwear according to the invention, FIG. 2 is a top view of the footwear of FIG. 1, which is cut in the calf-shin portion, FIG. 3 is a top view of an extended heat exchanging system, which is cut along the plane parallel to the ribbed plate, FIG. 4 is a transversal cross-section of the ribbed plate provided with an elastic foil, FIG. 5 is a vertical periaxial cut of another embodiment of the warming footwear according to the invention, FIG. 6 is a top view of the footwear of FIG. 5, which is cut in the calf-shin portion, FIG. 7 is a transversal cross-section of the footwear of FIG. 5 in the instep portion.

A heat exchanging system 1, composed of a ribbed plate 11, of an elastic foil 12 and of two nonreturn valves 13, 14, is incorporated in an inshoe 2, which is covered by an upper shoe 3 (FIGS. 1, 2). The ribbed plate 11 passes within the inshoe 2 from a shin portion d over an instep portion c and a toe portion b to a calf portion a. The ribbed plate 11 is on its one side along its edge surrounded by a border rib 111. On the same side of the plate 11 and approximately along its longer axis, a partition rib 112 is performed, dividing said plate side along its entire length from the shin portion d to the calf portion a in two portions (FIGS. 3, 4). The end portions of the partition rib 112 get close to the border rib 111, they do not touch it, however. The whole said side of the plate 11 is covered by an elastic foil 12, which is fastened to the ribs 111, 112 along their complete length. On both sides of the partition rib 112 there are conducted conduits 113, 114, respectively, which are limited by the plate 11, the foil 12 and the ribs 111, 112. The conduits 113, 114 are filled up with a heat transferring liquid. The nonreturn valves 13, 14 are inserted into the conduits 113 and 114, respectively, so that they are oriented in the same sense with a closed conduit loop being built by the conduits 113, 114.

The conduits 113, 114 get broader on one hand in the portion a and the other hand in the portions b, c, d; in said portions the conduits 113, 114 are divided by longitudinal directing ribs 115 into conduits 113', 113", ..., and 114', 114", ..., respectively.

The elastic foil 12 is a part of the inner surface 21 of the inshoe 2.

According to another embodiment of the warming footwear, the ribs 111, 112, 115 are elastically resilient and the foil 12 is fastened to the directing ribs 115 as well.

According to a further embodiment of the invention, a sunlight collector 4 (FIGS. 5, 6, 7) is performed by providing an opening 41 in the inshoe 2, and in the upper shoe 3 over the ribbed plate 11 and by fastening a transparent windowpane 42 to the border of the opening 41.

The operation of the warming footwear according to the invention is as follows In the portion a on the one hand and in the portions b, c, d on the other hand, the elastic foil 12 or, alternatively, said foil 12 and elastically resilient ribs 111, 112, 115 in the second embodiment of the invention resemble(s) bellows, expanding and flattening alternately under the pressure of the moving foot. By the nonreturn valves 13, 14 it is achieved that the liquid circulates in the closed loop of the conduits 113, 114 permanently in one sense. In the course of this circulation the liquid receives heat through the foil 12 from the warm portions a, d of the calf and the shin, respectively, and, alternatively, also through the plate 11, which is irradiated by sunlight within the collector 4, and delivers heat to the cold portions of the foot sole, which is poorly supplied with blood, particularly because of the tightly locked footwear. It has been established by measurements that the foot sole in the warming footwear according to the invention is some degrees warmer than the foot sole in the footwear not comprising the warming system 1.

I claim:

1. Warming footwear comprising:
   an upper shoe having a shin portion, an instep portion, a toe portion and a calf portion,
   an inshoe inserted in said upper shoe, a ribbed plate incorporated in said inshoe and extending from said shin portion, over said instep portion and said toe portion to said calf portion, a heat conducting, elastic foil entirely covering said ribbed plate and said foil forming a part of an inner surface of said inshoe, and a heat exchanging system including one side of said ribbed plate includes a border rib defining a periphery of said ribbed plate and a partition rib extending from said calf portion to said instep portion and dividing said one side of said ribbed plate in two portions and said partition rib being everywhere spaced from said border rib, and said elastic foil being fastened to said periphery all along a length of said border rib, and either of two mutually interconnected conduits, which are limited by said ribbed plate, by said foil and by said partition rib, being filled with a heat transferring liquid flowing through said heat exchanging system, and two nonreturn valves being located in a path of said heat transferring liquid and being open in the same direction of the path of said heat transferring liquid.

2. Warming footwear as claimed in claim 1, wherein said conduits in said calf portion and on said toe, instep and shin portions are connected to conduits which are separated from one another by longitudinal directing ribs.

3. Warming footwear as claimed in claim 2, wherein said partition rib, said border rib and said directing ribs are elastically resilient and said foil is fastened to said directing ribs all along their length.

4. Warming footwear as claimed in claim 2, wherein a transparent windowpane is fastened along its edges to borders of an opening, provided in the inshoe and in the upper shoe over said ribbed plate for transfer of heat from sunlight through said windowpane to said heat transferring liquid.

* * * * *